United States Patent [19]

Maeda

[11] 4,417,259

[45] Nov. 22, 1983

[54] METHOD OF PREVENTING INK CLOGGING IN INK DROPLET PROJECTING DEVICE, AN INK DROPLET PROJECTING DEVICE, AND AN INK JET PRINTER

[75] Inventor: Junji Maeda, Kyoto, Japan

[73] Assignee: Sanyo Denki Kabushiki Kaisha, Moriguchi, Japan

[21] Appl. No.: 342,646

[22] Filed: Jan. 25, 1982

[30] Foreign Application Priority Data

| | | | |
|---|---|---|---|
| Feb. 4, 1981 | [JP] | Japan | 56-16180 |
| Mar. 11, 1981 | [JP] | Japan | 56-35623 |
| Jul. 6, 1981 | [JP] | Japan | 56-105960 |
| Jul. 17, 1981 | [JP] | Japan | 56-112727 |
| Sep. 19, 1981 | [JP] | Japan | 56-139314[U] |

[51] Int. Cl.[3] .......... G01D 15/18

[52] U.S. Cl. .......... 346/140 R

[58] Field of Search .......... 346/140 R, 75, 1.1

[56] References Cited

U.S. PATENT DOCUMENTS

| | | | |
|---|---|---|---|
| 3,839,721 | 10/1974 | Chen | 346/75 |
| 4,106,032 | 8/1978 | Miura | 346/140 R |
| 4,223,324 | 9/1980 | Yamamori | 346/140 R |
| 4,296,418 | 10/1981 | Yamazaki | 346/140 R X |
| 4,301,460 | 11/1981 | Miura | 346/140 R X |
| 4,358,781 | 11/1982 | Yamamori | 346/140 R |

*Primary Examiner*—Joseph W. Hartary

*Attorney, Agent, or Firm*—Darby & Darby

[57] ABSTRACT

An on-demand type ink jet printer and an ink droplet projecting device to be used for said printer, which prevents clogging in the orifice resulting from drying and solidification of ink and is constructed in such manner that an air cell filled with air at the time of ink droplet projection and with a liquid at the time of non-ink-droplet-projection is provided in front of an orifice through which ink droplets are projected, and that, in said air cell another orifice facing the aforesaid orifice is coaxially provided in a position opposite to that of the aforesaid orifice.

29 Claims, 15 Drawing Figures

METHOD OF PREVENTING INK CLOGGING IN INK DROPLET PROJECTING DEVICE, AN INK DROPLET PROJECTING DEVICE, AND AN INK JET PRINTER

BACKGROUND OF THE INVENTION (1) Field of the Invention

This invention relates to an ink jet printer for recording patterns of letters, figures, etc. with ink droplets and an ink droplet projecting device used in this printer.

(2) Description of the Prior Art

An ink jet printer of non-impact type has excellent features such as emission of noise at low level, applicability to the ordinary kind of paper, and feasibility of easy color printing. Ink jet printers now in practical use are various in type such as electric charge control type, electric field control one, on-demand one, and ink-mist one, among which the on-demand type is widely used because of advantages thereof that unused ink need not to be withdrawn, coloring is quite easy, and color shade can be varied by altering the diameter and the number of ink droplets. Generally, such on-demand type ink jet printer, particularly the ink droplet projecting device thereof, is further classified into two types: one being the so-called "non-air-flow type" provided with an ink projecting head having an ink cell furnished with an orifice and a vibrating plate on the peripheral wall thereof for projecting ink contained in the ink cell through the orifice toward the recording paper by vibrating said vibrating plate with imparting the electric signal thereto; and the other being the so-called "air-flow type" in which an air cell provided with the 2nd orifice (air jetting orifice) positioned in front of the ink cell and facing the 1st orifice of said ink cell is formed so that pressurized air is blown from this air cell through said air jetting orifice toward the recording paper for adapting ink droplets projected through the 1st orifice to be spouted toward the recording paper. Either type, however, is followed by such drawbacks that, since the orifice opens to the air and consequently water content of the ink in the cell evaporates through the orifice during suspension of use of the ink projecting head, not only solid constituents of the ink stick to the periphery of the orifice and sometimes clog the orifice but also a reduced volume of ink as a result of water content evaporation causes suction of air into the ink cell and insufficient transmission of pressure wave from the vibrating plate to ink and, accordingly, irregular projections of ink droplets.

In view of these problems, several proposals as described under have hitherto been made but have not yet brought about satisfactory solutions.

(a) To put a lid over the orifice (b) To keep the orifice and its ambient space in humid atmosphere (c) To mix ink with anti-drying agents such as polyethyleneglycol, ethyleneglycol, etc.

(d) To remove solidifying ink sticking to the orifice by the application of high pressure to ink in the cell.

OBJECTS OF THE INVENTION

The present invention is intended to solve various problems of the prior art as described above.

The first object of this invention is to provide a method enabling exact ink droplet projection or printing while preventing clogging in the orifice in the ink cell, as well as to provide an ink droplet projecting device embodying said method and an ink jet printer using said device.

The second object of this invention is to provide an ink droplet projecting device and an ink jet printer using said device, wherein ink droplet projection or printing is performed surely and exactly by preventing the air from being sucked into the ink cell dur to ink volume reduction occurring with evaporation of water content of ink, or by preventing an extraneous mechanical impact which may induce entrance of the air into the ink cell, without causing any obstruction to pressure transmission for ink droplet projection.

The third object of this invention is to provide an ink droplet projecting device and an ink jet printer using said device, wherein sure supply or replenishment of liquid to be introduced into the air cell disposed in front of the orifice, through which ink droplets from the ink cell are projected, for the purpose of preventing clogging in said orifice and consequent increase in clogging prevention capability are intended.

The fourth object of this invention is to provide an ink droplet projecting device and an ink jet printer using said device, wherein a liquid introduced into said air cell is efficiently discharged and recovered.

The fifth object of this invention is to provide an ink droplet projecting device and an ink jet printer using said device, wherein the structure for introducing ink into the air cell is made simple.

The above and further objects and novel features of the invention will more fully be apparent from the following detailed description when the same is read in connection with accompanying drawings.

DETAILED DESCRIPTION OF THE INVENTION

Features of an ink droplet projecting device and a method of preventing ink clogging therein according to this invention reside in such design that a fluid is introduced into an air cell disposed on the front side of the 1st orifice through which ink droplets for printing are projected, the air cell being provided with the 2nd orifice which lies oppositely to said 1st orifice and ink droplets are outwardly projected therethrough, while the device is in non-printing operation, for the purpose of preventing ink clogging in said 1st orifice. Said air cell may be in such structure that pressurized air is fed into the cell so as to let air current emit from the 2nd orifice for giving assistance to ink droplet projection, or that only said fluid is introduced into the air cell for the purpose of only preventing clogging in the 1st orifice without taking further measures. As a liquid to be introduced into the air cell, ink to be projected for printing or other liquid such as water or ink thinner which cause no trouble even if a few quantity thereof is mixed with ink may be used.

A description of this invention will be made by way of embodiments and drawings thereof as hereunder. This invention, however, is applicable to printers depending on other manners of performance.

Figure 1:
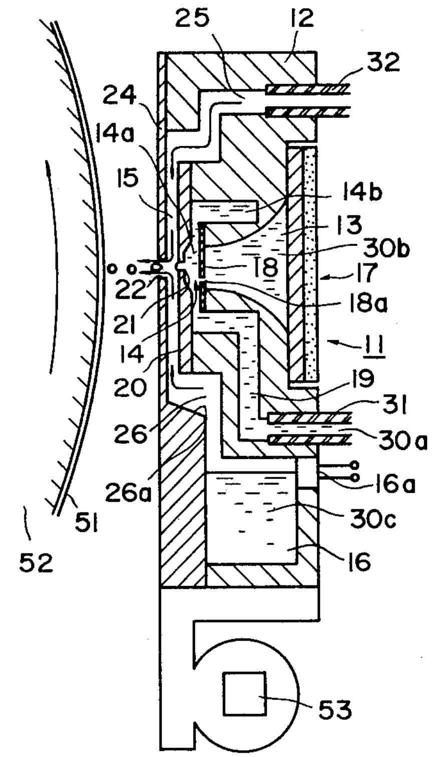
FIG. 1 is a vertical sectional view of an ink droplet projecting device as the first embodiment of this invention in the printing operation position.

In FIG. 1, the reference numeral 11 indicates an ink droplet projecting head transversely movably supported by the guide shaft 53 horizontally disposed in parallel with the drum 52 around which the sheet of recording paper is wound. The drum 52 is rotated in the direction from bottom to top on the side opposite to the head 11 as shown by the arrow mark and the head is driven to move from left to right when viewed from the front side (or rear side of the head 11). Printing on the recording paper 51 is performed depending on the revolution of the drum 52 as main scanning and the displacement of the head 11 as subsidiary scanning, and one traverse of the head completes printing on one sheet of recording paper, during which the drum revolves at high speed. The ink droplet projecting head 11 is made of stainless steel and has a main body 12 in the shape of cylindrical pillar of short axial length comprising a pressure cell 13, ink cell 14, air cell 15, and ink vessel 16 arranged therein. A pressure cell 13 is located in a position slightly higher than the center of the main body 12 and reduces in diameter along the direction from rear to front so as to be formed like a horn as a whole, to which a piezo-electric element 17 is secured at the rearmost surface thereof so as to cover a diametrally large opening part lying behind said cell 13. The piezo-electric element 17 may be of unimorphic type made of a piezo-electric ceramic plate having a metallic plate stuck thereto or of bimorphic type made of two piezo-electric ceramic plates between which a metallic plate is interposed. An ink cell 14 is formed on the front side of the pressure cell 13 and a thin stainless steel vibrator 18 is provided for covering a diametrally small opening, so as to partition the pressure cell 13 from the ink cell 14. The ink cell comprises a layer-like part 14*a* positioned in front of the pressure cell 13, and a cylindrical part 14*b* formed so as to surrounding the front part of the pressure cell 13. An ink feeding tubular part 19 opening at the rear surface of the main body 12 is formed at a point on the cylindrical part 14*b* so as to communicate with each other and a flexible tube 31 communicating with the ink cartridge not shown is connected to the rear surface of the main body 12. An air cell 15 is formed on the front side of the layer-like part 14*a* of the ink cell 14 and a front plate 20 having the 1st orifice 21 is disposed so as to locate said orifice 21 coaxially with the small diameter opening of the pressure cell 13 and partition the air cell 15 from the ink cell 14. On the ink cell side of the front plate 20, a conical recess centering around the orifice 21 is formed so as to feed ink smoothly to the nearby part of the orifice 21.

Figure 2:
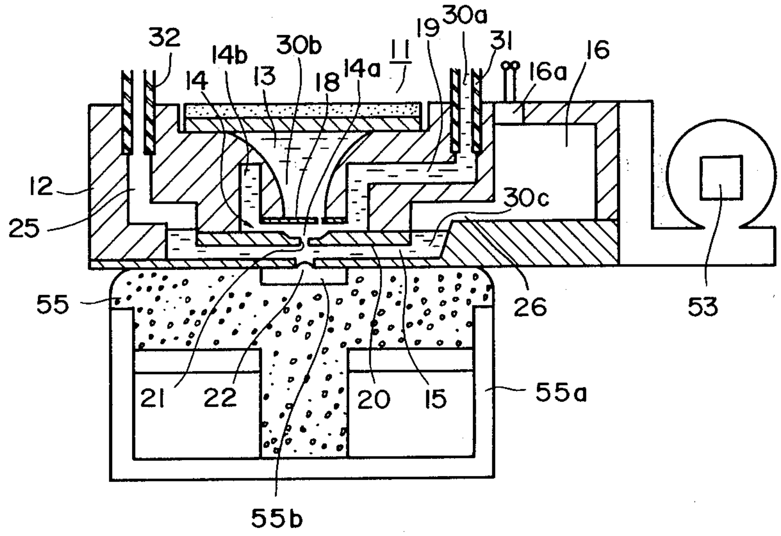
FIG. 2 is a vertical sectional view thereof in the home position.

The air cell 15 is formed of a recess provided in front of the main body 12 covered by a cover plate 24 extending upwardly from the front wall part of the ink vessel 16, and the 2nd orifice 22 diametrally larger than the orifice 21 is provided coaxially with the orifice 21 at the part opposite to the orifice 21 on the cover plate 24. An annular groove is formed around the flat air cell 15 and an air feeding tubular part 25 is formed on the periphery of said annular groove communicably so as to communicate with said groove at a part thereof, and a flexible tube 32 communicating with the air pump not shown is connected with the opening located on the rear surface of the main body 12. The pressurized air fed to the flexible tube 32 enter the air cell 15 throughout the periphery of the cell and escapes through the orifice 22. An ink introducing tubular part 26 is formed below the air cell 15 and communicates with the ink vessel 16 formed under the pressure cell 13. The ink vessel 16 has a capacity capable of containing ink 30*c* in quantity enough for filling the air cell 15 and is equipped with an ink level meter 16*a* emitting different signals according to ink quantity for informing of whether said quantity is as much as described above or less. As an ink level meter 16*a*, a liquid sensor of electrostatic capacity system or electric resistance system, or an optical sensor such as a photo-coupler can be used. The ink vessel 16 is disposed slightly closer to the rear side than the air cell 15 so that ink 30*c* enters the air cell 15 without remaining in the ink vessel 16 when the head 11 is adapted to lie down frontward as shown in FIG. 2. Since the air cell 15 and the ink vessel 16 are positioned differently from each other, that is, in the front and the rear side, respectively, as described above, a stepped portion 26*a* is formed in the ink introducing tubular part 26 and provided with an inclination descending toward the rear side for expiditing flowing-down of ink from the air cell 15 to the ink vessel 16 when the head that has been let lie down is returned to the initial position as shown in FIG. 1.

Figure 3:
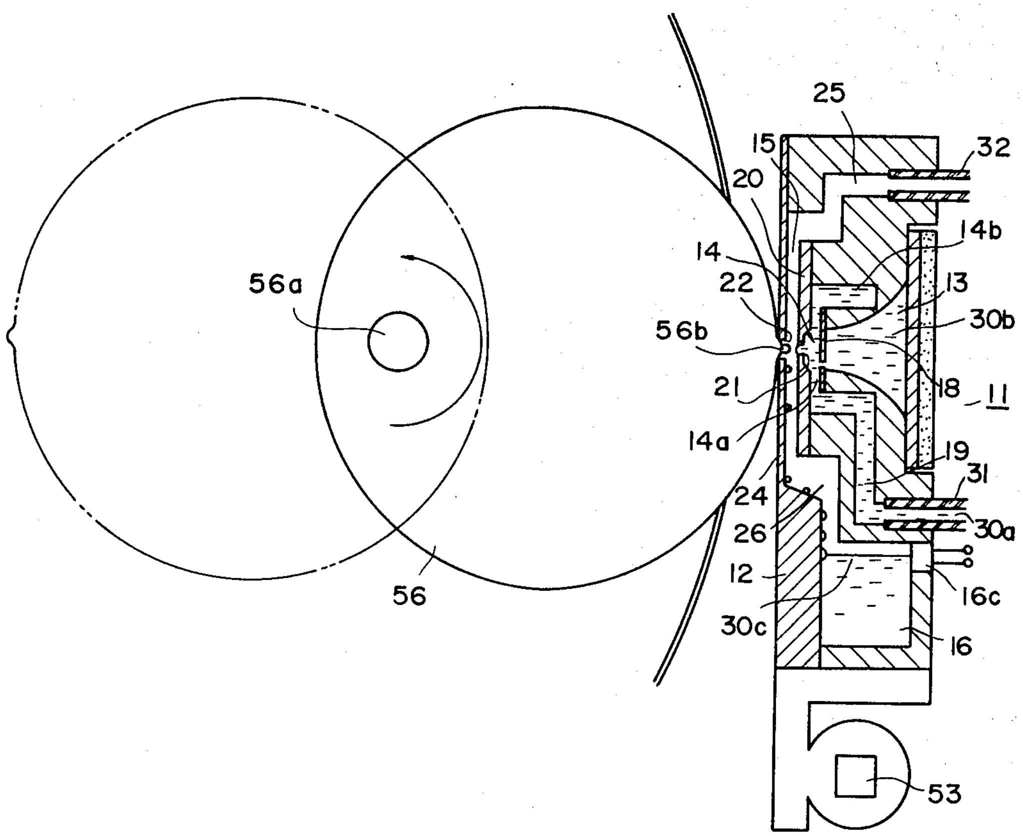
FIG. 3 is a vertical sectional view thereof in the stand-by position.

The pressure cell 13 is filled with ink 30*b*. The ink 30*b* is a medium for transmitting pressure to the passive vibrator 18, the pressure being generated by impressing electric signals to the piezo-electric element 17 for vibration thereof. Since the pressure cell 13 reduces in diameter along the direction toward the front side, vibration of the piezo-electric element 17 is amplified and vibrates the vibrator 18 at larger amplitude. As a pressure transmitting medium, not only ink 30*b* but also other liquid as water, viscoelastic substance as silicone grease, or magnetic fluid as colloidal mixture of liquid and powdery substance can be used. The vibrator 18 is provided with a minute orifice 18*a* for pressure balancing. This pressure balancing orifice 18*a* is intended for balancing pressure on the side of the ink cell 14 with that on the side of the pressure cell 13 so that the vibrator 18 may not be broken when the pressure transmitting medium is poured into the pressure cell 13. This embodiment is in a novel structure that has never been found so far, wherein pressure generated by vibration of the piezo-electric element 17 vibrating in response to electric signals is transmitted to the vibrator 18 through the pressure transmitting medium in the pressure cell 13, and passive vibration of said vibrator 18 causes ink to be projected through the orifice 21. The pressure balancing orifice 18*a* should be small (for example, 30–70 μm when the smallest diameter of the pressure cell is 20 mm) and be eccentrically disposed with respect to the orifice 21. However, since the pressure cell 13 communicates with the ink cell 14 on account of the presence of the pressure balancing orifice 18*a*, ink 30*b* as a pressure transmitting medium to be contained in the pressure cell 13 should preferably be the same in kind as printing ink 30*a* introduced into the ink cell 14 for preventing trouble which may be caused by intermixing of different kinds of ink. Ink 30*a* is introduced into the ink cell 14 through the flexible tube 31, pushed out through orifices 21 and 22 to the outside of the head 11 due to vibration of the vibrator 18, and projected toward the recording paper 51; and, as described later, when the head is in the stand-by position as shown in FIG. 3, and the ink level meter 16*a* detects a shortage of ink 30*c* in the ink vessel 16, the 2nd orifice 22 is closed so that ink droplets projected through the 1st orifice 21 are let to drop from the air cell 15 to the ink vessel 16. The reason why ink 30*c* is used as a liquid to be introduced into the air cell 15 is that a structure is provided for replenishing the ink vessel with printing ink, and, therefore, other liquid than ink, for example, water, is applicable to the other embodiments as described later, which are capable of being provided with supply means different from that of this embodiment.

Figure 4:
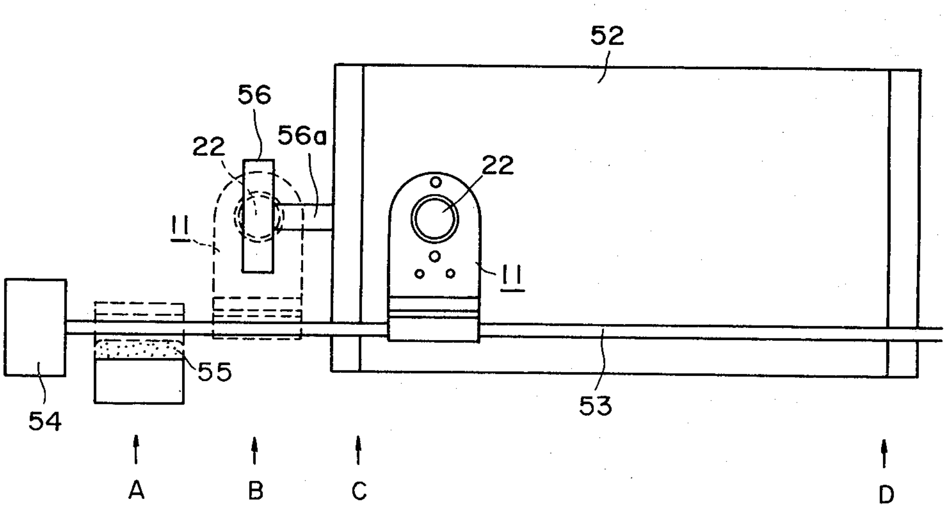
FIG. 4 is a modelled front view roughly showing the major parts of an ink jet printer according to this invention.

In FIG. 4, the numeral 54 stands for a head driving device which drives the head 11 transversely and revolves the guide shaft 53. During non-printing operation of the ink jet printer, particularly while stopped, the head 11 is in the home position A leftwardly apart from the drum 52 and close to the driving device 54, and, immediately before or after printing on the drum 52, is in the stand-by position B apart from the left end of the drum 52 and slightly close to the home position A, whereas, during printing operation, it lies in a position between the printing-start position C on the left end of the drum 52 and the printing-finish position D on the right end of the drum 52. FIG. 2 shows the head 11 lying in the home position A and being laid down frontward after turned by 90 degrees in angle with the turn of the guide shaft 53 toward the drum 52 by the same degrees as above actuated by the driving device 54. A covering body 55 is provided in the home position A so as to face the front side of the head 11 lying down frontward and to cover the orifice 22. The covering body is made of porus substance such as foamed urethane shaped like cube in an appropriate thickness, the lower part thereof being received by the vessel 55*a* for which water is supplied occasionally. A recess 55*b* is provided for the covering body 55 at the part facing the orifice 22 and water reaches the top of this recess 55 due to capillary action. Therefore, the 2nd orifice 22 is relieved from drying and solidification of ink by the covering body 55 lying in the home position A. The head 11 stands upright in the stand-by position B in which said head 11 lies before start of printing operation or immediately after the finish of said operation in the same way as during printing operation (FIG. 3).

A support shaft 56*a* is provided on the left end of the drum 52 coaxially with said drum 52, to which a disk-like lid 56 is fitted on eccentrically with the shaft 56*a*. When a head position detector not shown here (for example, a photo-coupler set at the stand-by position) detects that the head 11 is in the stand-by position B after the finish of printing and the ink level meter 16*a* detects a shortage of ink 30*c*, the lid 56 turns so that a part on the periphery most distant from the support shaft 56*a* turns by about 180 degrees in angle from the retreat position (shown by an alternate long and two short dashes line) to the closing position in which said part stops as shown by a continuous line. The disk-like lid 56 is made of rubber or the like and provided with a small projection 56*b* in the position farthest from the support shaft 56*a*, and said projection 56*b* is formed to fit into the 2nd orifice 22 for closing when the head 11 is in the stand-by position and the lid 56 turns to the closing position. In this way, while leaving the orifice 22 closed and impressing transmitting signals to the piezo-electric element 17, ink droplets are projected through the 1st orifice 21 and dropped from the air cell 15 into the ink vessel 16 for replenishing ink 30*c* without being projected through the orifice 22. On the other hand, the head 11 is controlled by the driving device 54 so as to be returned to the home position A.

Next, the performance of an ink droplet projecting device in such a structure as described above or an ink jet printer using said device will be described. During suspension of printing, the head 11 is in the home position A and assumes a lying-down posture as shown in FIG. 2, when ink 30*c* in the ink vessel 16 flows to stay in the air cell 15 and prevents ink 30*a* around the orifice 21 of the ink cell 14 from drying and solidifying. The orifice 22 is closed by the covering body 55 and the recess 56 is under wet condition, whereby ink 30*c* in the air cell 15 being prevented from drying and solidifying which cause clogging in the orifice 22. When standing by the arrival of signals for printing or when returning to the home position side after the finish of printing, the head 11 is in the stand-by position B and stands upright. In preparation for the latter case, there is provided a control circuit for driving the lid 56 to close the orifice 22 as described earlier and transmitting signals to the piezo-electric element 17 for projecting ink droplets when ink 30*c* in the ink vessel 16 is detected as short by the ink level meter 16*a*. Ink droplets projected through the orifice 22 collide with the projection 56*b* of the lid 56 without getting out of the head 11 and flow down through the air cell 15 along the inside wall of the cover plate 24 to replenish the ink vessel 16 with ink. When the ink level meter 16*a* detects ink 30*c* to be as much as required in quantity, the piezo-vibrator is stopped for suspending replenishment of ink.

During printing operation, the head 11 is laid between the printing-start position C and the printing-finish position D and stands upright as shown in FIG. 1. Upon arrival of signal for printing, the piezo-electric element vibrates and consequent pressure is transmitted through ink 30*b* while being amplified to vibrate the passive vibrator 18 and to let ink 30*a* spout as droplets through the orifice 21. Since the air cell 15 is supplied with pressurized air fed through the tubular air passage 25 and the annular groove surrounding the air cell 15, ink droplets projected through the orifice 21 are boosted, when projected through the orifice 22, by the pressurized air jetted straight through the orifice 22. As the orifices 21 and 22 are all in such a state as shown in FIG. 1 and not clogged with dry and solidified ink, ink droplets are surely projected so as to ensure fine printing. Consumption of ink contained in the ink cell 14 as the result of projection of ink droplets is compensated with the supply of ink from the side of the ink cartridge by utilizing capillary action of ink or pressure application to the cartridge.

Figure 5:
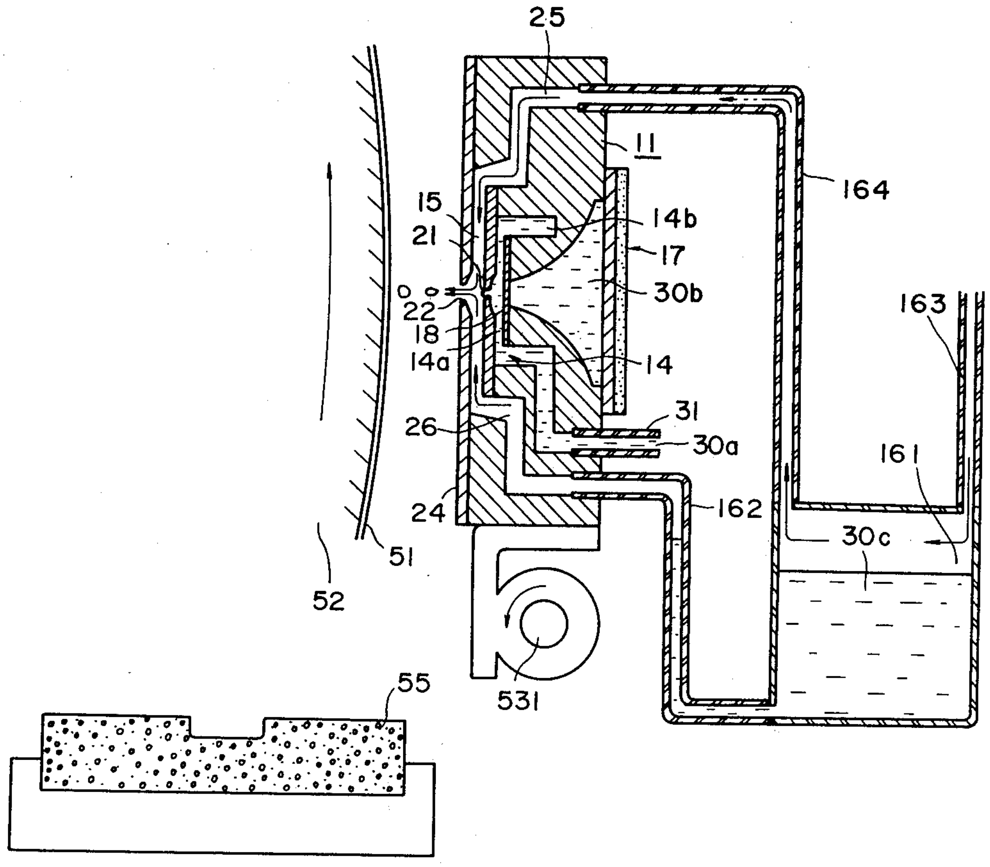
FIG. 5 is a vertical sectional view of an ink droplet projecting device as the second embodiment of this invention in the printing operation position.
Figure 6:
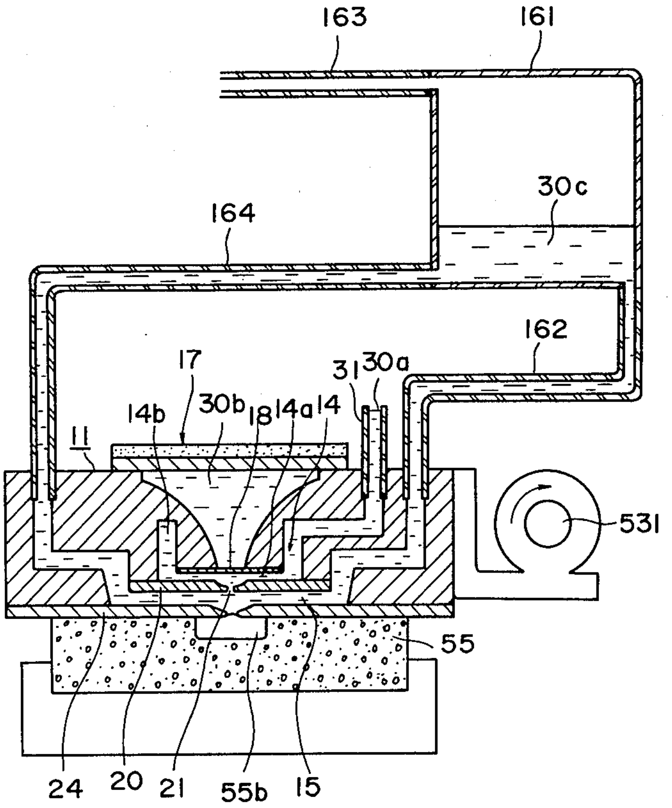
FIG. 6 is a vertical sectional view thereof in the home position.

The second embodiment is shown in FIGS. 5 and 6. Difference between this embodiment and the other shown in FIGS. 1 through 3 is that: an ink vessel 161 to contain ink 30*c* to be introduced into the air cell 15 during non-printing operation is disposed outside the head 11; the head 11 and the bottom part of the ink vessel 161 are connected to the ink introducing tubular portion 26 with a solid pipe 162; a pipe 163 connecting with the air pump not shown and another solid pipe 164 connecting with the tubular air passage 25 in the head 11 are provided on the top portion of the ink vessel 161; and, with the aid of these pipes and reinforcing members not shown, the ink vessel 161 and the head 11, when lying in the home position, are laid down frontward by 90 degrees in angle in association with each other as shown in FIG. 6. The ink vessel 161 is positioned lower than the air cell 15 during printing operation and higher while lying in the home position. In this embodiment, the guide shaft 531 transversely supported in parallel with the drum 52 is round in cross-section and permits the head 11 and the ink vessel 161 to turn therearound. In the case of this embodiment, too, ink 30*c* is introduced into the air cell 15 when the head is in the home position of non-printing operation and the 2nd orifice is covered up by the covering body 55, thereby clogging in the 1st and the 2nd orifices being completely prevented and sure printing being obtained. Further, in this embodiment, ink 30*c* may be supplied according to the method employed in the previous first embodiment or from the side of the pipe 163.

Figure 7:
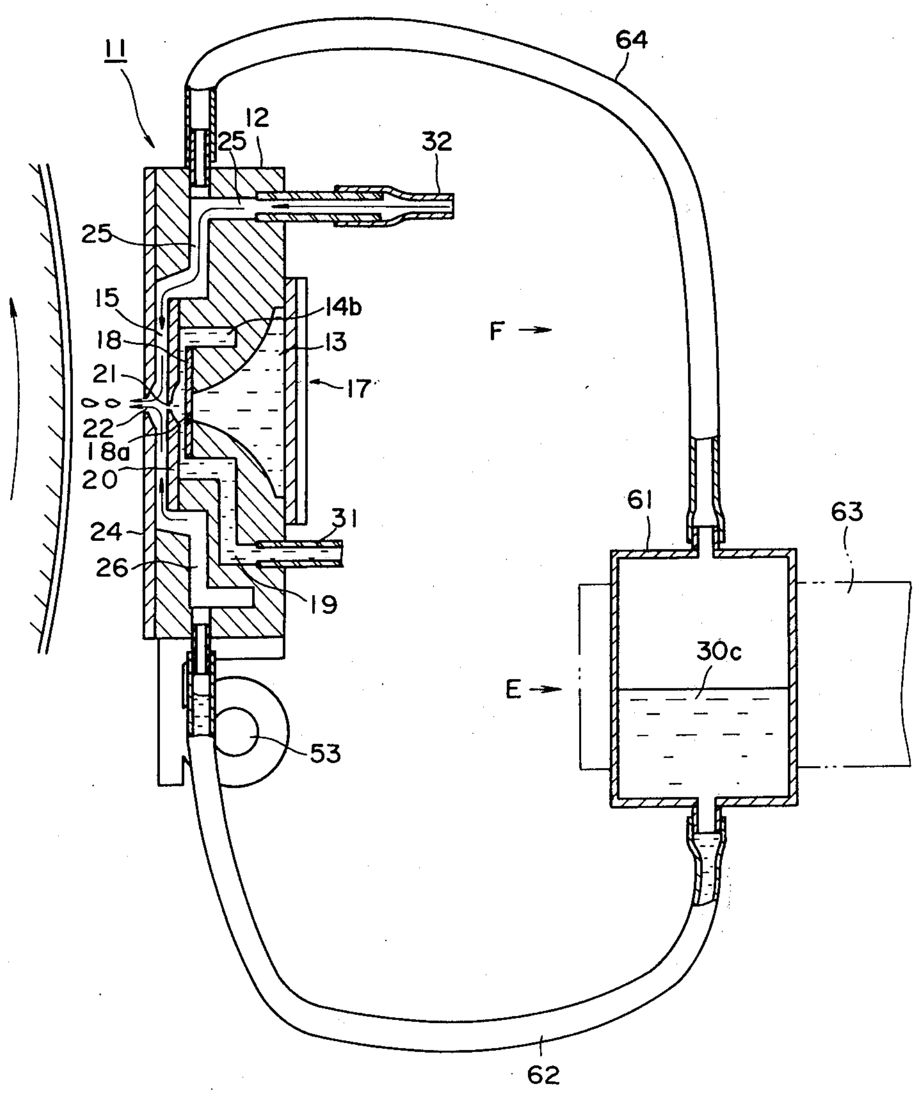
FIG. 7 is a vertical sectional view of an ink droplet projecting device as the third embodiment of this invention in the printing operation position.
Figure 8:
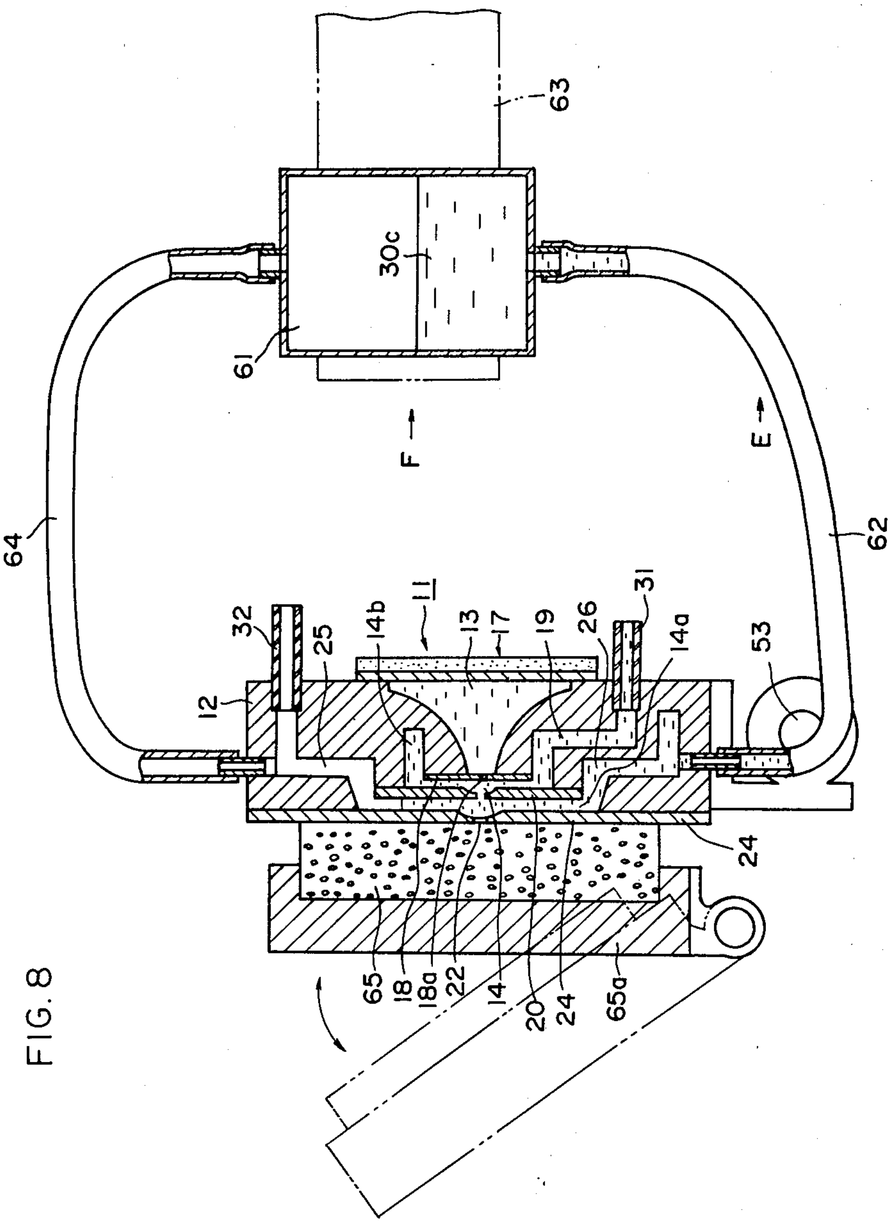
FIG. 8 is a vertical sectional view thereof in the home position.

Then, the third embodiment shown in FIGS. 7 and 8 will be described. In this embodiment, the head is kept unvaried in posture and height and the ink vessel 61 containing ink 30*c* to be introduced into the air cell 15 is moved up and down independently of the head. A flexible tube 62 is connected to the ink introducing tubular part 26 communicating with the bottom part of the air cell 15 and the other end of this tube 62 is connected to the tubular opening on the bottom of the ink vessel 61 embraced by the support frame 63 reciprocated vertically. The air cell 15 is supplied with pressurized air through the flexible tube 32, the air feeding tubular part 25 in the head 11, and the annular groove therearound, said feeding tubular part 25 being communicated with the upper end of the ink vessel 61 by a flexible tube 64. The support frame 63 and the ink vessel 61 are laid in the ink recovery position E lower than the air cell 15 during printing operation as shown in FIG. 7, and in the ink introduction position F slightly higher than the air cell 15 during non-printing operation when the head is in the home position as shown in FIG. 8; and the ink vessel 61 is filled with a sufficient quantity of ink 30*c* so that said ink is filled to a level higher than at least the 1st and the 2nd orifice 21 and 22, respectively, when the ink vessel 61 is laid in the ink introduction position F. Although any kind of means may be available for vertically reciprocating the support frame 63 and the ink vessel 61, a simple and convenient structure may be used as follows: the ink vessel 61 is made capable of moving right and left in accompany with the head 11 and the left end of the guide rail (in parallel with the guide shaft 53) for guiding the ink vessel 61 is upwardly slanted from the printing-start position C to the home position A, thereby enabling up-and-down movement of the ink vessel 61 depending on only the control means for traverse of the head 11.

As shown in FIG. 8, by raising the ink vessel 61 to the ink introduction position F, ink 30*c* is introduced into the air cell 15 through the flexible tube 62 and, in this case, ink 30*c* smoothly flows because the ink vessel 61 communicates with the air cell 15. A covering body 65 driven by the driving mechanism not shown and rotated around the shaft extending in parallel with the guide shaft 53 as shown in FIG. 8 is provided, which stands vertically as shown by a continuous line in FIG. 8 when the head is in the home position, to touch the cover plate 24 of the head 11 and cover up the 2nd orifice 22, and retreats while slanting frontward when the head leaves the home position. The covering body 65 is made of porus material such as foamed urethane or the like and attached to the frame 65*a* turning around aforesaid shaft, so as to mitigate impact caused when the covering body 65 touches the head 11. Incidentally, to cover up the 2nd orifice 22 with the covering body is effective for preventing clogging in said orifice 22 but, in this embodiment, provision of a covering body is not necessarily required. In addition, since the head 11 is in a standing position, ink 30*c* in the air cell 15 is prevented from leakage from the orifice 22 of minute diameter by surface tension of ink itself, whereby requiring no covering body. (In the first and the second embodiments, too, ink leakage from the 2nd orifice 22 is scarcely probable on account of surface tension of ink.) However, clogging in the orifice is considered to be probable when covering over the orifice 22 by means of the covering body 65 is not applied. But, during printing operation, pressurized air is fed into the air cell 15 and, therefore, blows off dry and solidified ink from the orifice 22, even if clogging in said orifice with ink is present, so as to ensure printing without trouble.

This embodiment requires not a means of turning the head 11 but a means of moving up and down the ink vessel 61 which fulfils the purpose in spite of simpler structure than that of the former means and is capable of embodying a highly reliable and long-lived ink droplet projecting device. Moreover, this third embodiment is provided with a characteristic control means for ink supplying as follows: when arrival of the head 11 at the home position is detected, the covering body 65 is driven to cover up the orifice 22 and then the ink vessel raising means is driven to raise said vessel 61 to the ink introduction position F as well as the piezo-electric element 17 is vibrated by the application of signals thereto for projecting ink droplets through the orifice 21. Ink droplets thus projected collide with the covering body 65 and flow through the air cell 15 to join ink 30*c* that flowing from downside to the air cell 15 with the rise of the ink vessel 61. The rise of the ink vessel 61 not only introduces ink into the air cell 15 but also exhibits such effects as described under by means of projection of droplets through the orifice 21. That is, the dried ink firmly sticking to the peripheral portion of the orifice 21 precludes development of wet condition of said portion, which can not be prevented so far as depending on only introducing ink 30*c* from the ink vessel 61 to the air cell 15, and leaves bubbles at said portion which finally enter the ink cell 14. This problem of preclusion of wet condition, however, is solved by projection of droplets from the orifice 21 as previously described. A period of time for ink droplet projection in such a case as above is preferably determined to be long so that the air cell is filled with ink by feeding ink droplets only thereto even when no flowing of ink from the ink vessel 61 occurs for some reason. The time required for ink droplet projection in a typical head sized for practical use does not exceed two seconds.

Figure 9:
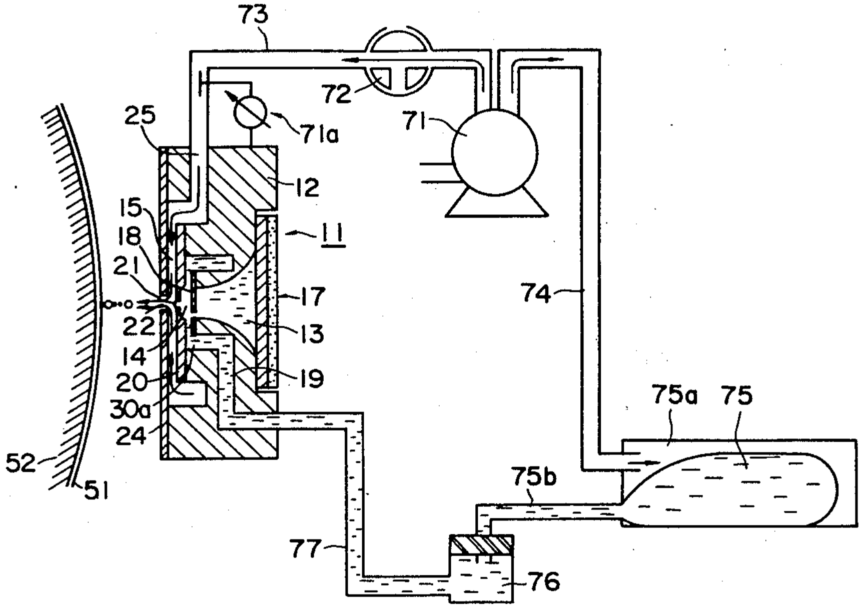
FIG. 9 is a vertical sectional view of an ink droplet projecting device as the fourth embodiment of this invention in the printing operation position.
Figure 10:
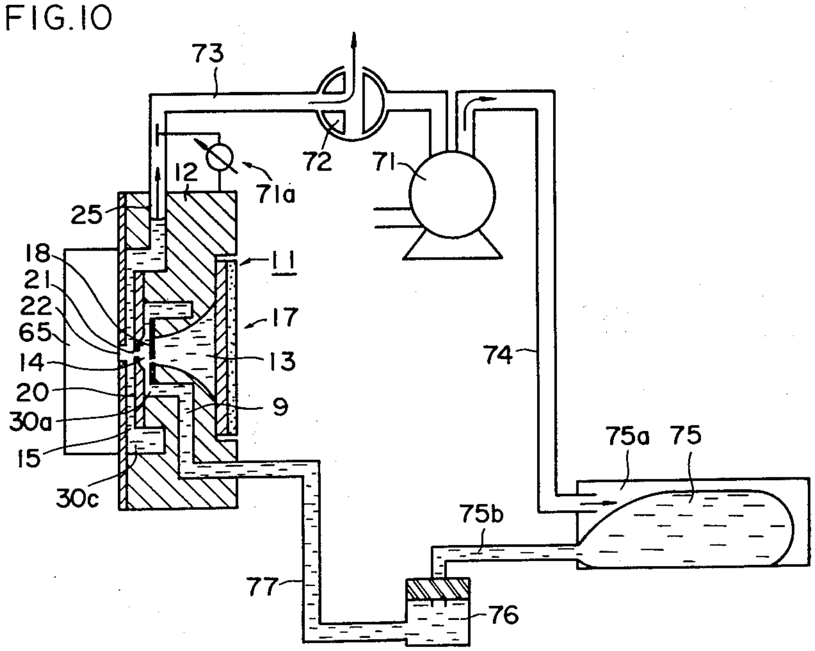
FIG. 10 is a vertical sectional view thereof in the home position.
Figure 11:
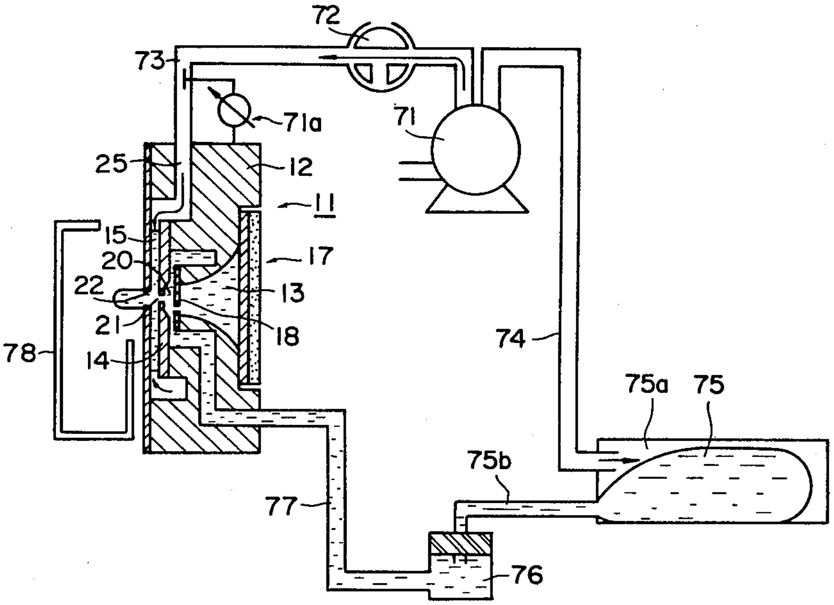
FIG. 11 is a vertical sectional view thereof in the stand-by position.

The fourth embodiment is shown in FIGS. 9, 10, and 11. This embodiment is characterized in that ink for printing is jointly used as that to be introduced into the air cell and ink introduction into and discharge from the air cell 15 depend on the pressure adjustment and not on the change of relative positions of the air cell and the ink vessel.

Concretely speaking, an annular groove provided around the flat air cell 15 is connected to a tube 73 through the air feeding passage 25 connecting with a part on the periphery of said groove. The tube 73 connects the 1st air blowing port of the air pump to the air feeding passage 25 and, in a halfway position thereof, is provided with an electromagnetic direction control valve 72 whose operation direction is changed by the electric signal. The 2nd air blowing port is connected to the case 75*a* of an ink cartridge 75 through the tube 74 so as to apply pressure to said cartridge 75 made of high molecular elastic filmy material. The ink cartridge 75 is replaceable after consumption of ink, and the tube 75*b* serving as an ink outlet of the cartridge 75 is detachable from the ink coupler 76 communicating with the ink feeding tubular part 19 of the head 11 through a tube 77. The ink level meter 71*a* is provided on the part extending upwardly from the air feeding tubular part 25 of the tube 73.

In the home position A, a covering body 65 similar to that used in the third embodiment is provided, as shown in FIG. 10, whereas, in the stand-by position, a discharged ink receptacle 78 is provided as shown in FIG. 11. Said receptacle 78 is in cubic configuration and disposed in a position facing the head 11 that lies in the stand-by position, the upper half portion thereof on the side of the head 11 including the part facing the orifice 22 being open.

During printing operation, as shown in FIG. 9, the electromagnetic valve 72 is arranged in a position so as to communicate the 1st air blowing port of the air pump 71 with the air cell 15, whereby pressurized air being fed into the air cell 15 and jetted through the orifice 22. Consequently, with vibrating the piezo-electric element 17 and letting ink 30*a* in the ink vessel 14 spout through the orifice 21 in the form of droplets, these droplets spout toward the recording paper while being enclosed by air current. Ink 30*a* reducing in quantity in the ink cell 14 due to projection of droplets is replenished with ink fed from the cartridge 75 to which pressure is applied by the air pump 71.

In the home position A, as shown in FIG. 10, the direction control electromagnetic valve 72 adapts the air cell to be open to the atmosphere and close the 1st air blowing port of the air pump 71, when, on the other hand, the covering body 65 is adapted to stand upright to cover up the orifice 22 and the electric signal is impressed to the piezo-vibrator 17. As a result, air pressure on the side of the ink cell 14 becomes higher than that on the side of the air cell 15 in addition to vibration of the vibrator 18, when ink 30*a* in the ink cell 14 flows into the air cell 15 and gradually fills up said cell because said cell is open to the atmosphere through the valve 72. The piezo-electric element 17 need not to be vibrated continuously throughout the abovesaid operation and may suffice even when vibrated only for the time for inducing ink flowing at the initial stage or feeding the pressurized air to the case 75 for applying pressure to the ink cartridge 75. When the ink level meter 16 detects ink level, the air pump 71 is stopped and the direction control electromagnetic valve 72 is switched as shown in FIG. 9, by which the orifice 21 is covered by ink 30*c* in the air cell 15 and accordingly prevented from being clogged. It goes without saying that stoppage and control of the air pump may depend on the timer, not on the ink level meter.

In the stand-by position B, the direction control electromagnetic valve 72 adapts the first air blowing port of the air pump 71 to communicate with the air cell 15 in the same way as in the case of printing operation, and also drives and adapts the air pump 71 to feed the pressurized air to the ink cartridge and the air cell 15. When the head is in the home position earlier than laid in the stand-by position, since the air cell 15 is filled with ink 30*c*, said ink is projected solely through the 2nd orifice 22 and immediately discharged into the receptacle 78 by the pressurized air fed to the air cell 15 through the annular groove around said cell 15. As a result, ink is already not present in the air cell 15 and air current is blowing through the orifice 22 when the head is put in the printing-start position, whereby immediate start of printing being enabled. Immediately after the finish of printing operation, too, the head 11 is put in the stand-by position but, in this case, is under the same condition as in the case of printing operation because of no presence of ink in the air cell 15. Further, pressurized air thus blown when the head is in the stand-by position B exhibits an effect to remove solidified ink sticking to the 2nd orifice.

Figure 12:
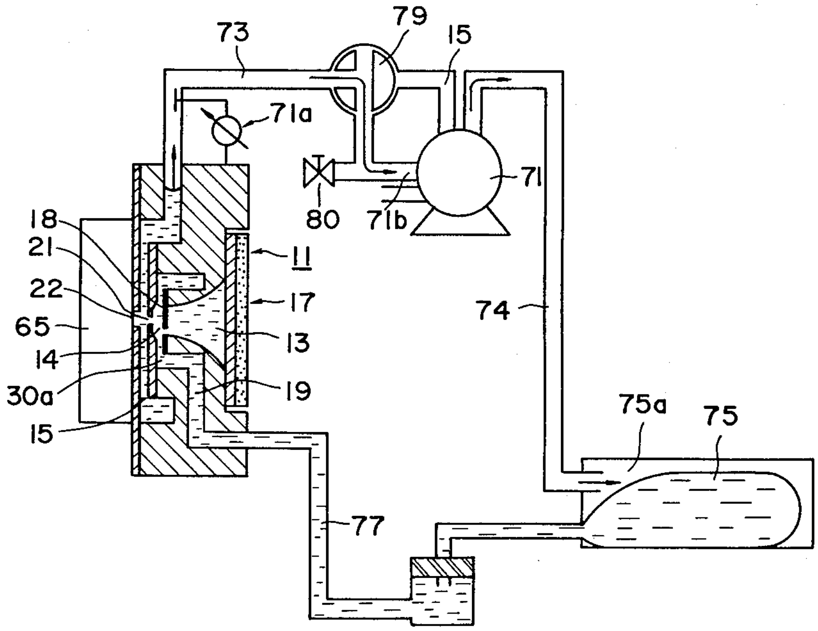
FIG. 12 is a vertical sectional view of a modification of the fourth embodiment.

FIG. 12 shows a modification of the embodiment shown in FIGS. 9 through 11. In this embodiment, the air suction port 71*a* of the air pump 71 is connected to the direction control electromagnetic valve of three-port type and also to the magnetic switching valve 80.

Two ports other than the one connected as above are connected to the 1st blowing port of the air pump 71 and to the air cell 15. One end of the valve 80 is made open. When the head is in printing operation or put in the stand-by position, the valve 80 is opened and the valve 79 is turned so that the first blowing port of the air pump 71 is connected to the air cell 15, thereby the same operation as that shown in FIGS. 9 through 11 being performed. On the other hand, in the home position A, the valve 80 is closed as shown in FIG. 12 and the valve 79 is turned so that the air suction port 71*b* of the air pump 71 is connected to the air cell 15. As a result, ink 30*a* in the ink cell 14 flows into the air cell 15 through the orifice 21 and ink is supplied for the ink cell 14 from the cartridge 75 because the 2nd orifice 22 is closed by the covering body 65 and the ink cartridge 75 is subjected to pressure of the pressurized air fed from the 2nd blowing port of the air pump 71, and the ink cell 14 is supplied with ink from the ink cartridge 75. Ink level in the air cell rises to the height of the ink level meter 71*a*. If the air pump 71 is stopped just when ink level reaches the ink level meter 71*a*, ink in the air cell 15 is kept as it is and the orifice 22 is also kept as covered. Measures may be taken for accelerating the flow of ink into the air cell 15 by vibrating the piezo-electric element 17 during the above operation.

Such an embodiment and a modification thereof as shown in FIGS. 9 through 11 and FIG. 12, respectively, require none of mechanism to change the relative positions of the air cell and the vessel containing ink to be introduced into said cell. Also, ink for printing can be also used for preventing clogging in the orifice 21 into which said ink is introduced and a pressurizing source for increasing power of ink droplets spouting through the 2nd orifice 22 can be utilized as a pressure control means for controlling the ink flow, thereby enabling compact structure of the device.

Figure 13:
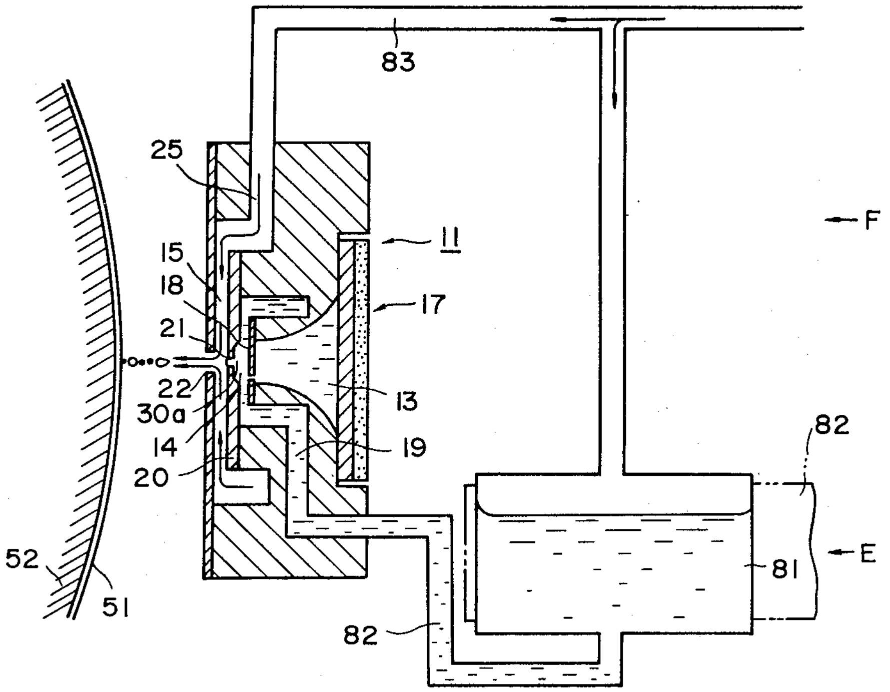
FIG. 13 is a vertical sectional view of an ink droplet projecting device as the fifth embodiment in the printing operation position.
Figure 14:
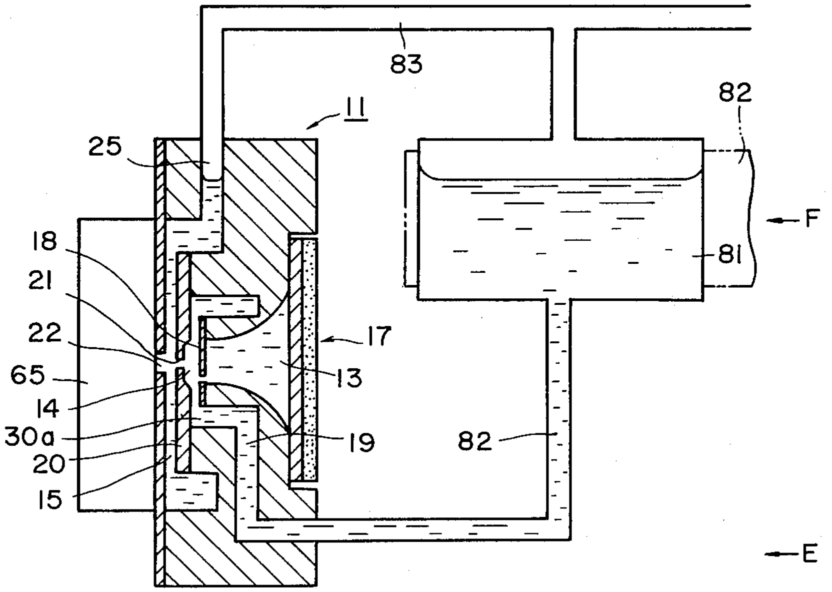
FIG. 14 is a vertical sectional view thereof in the home position.
Figure 15:
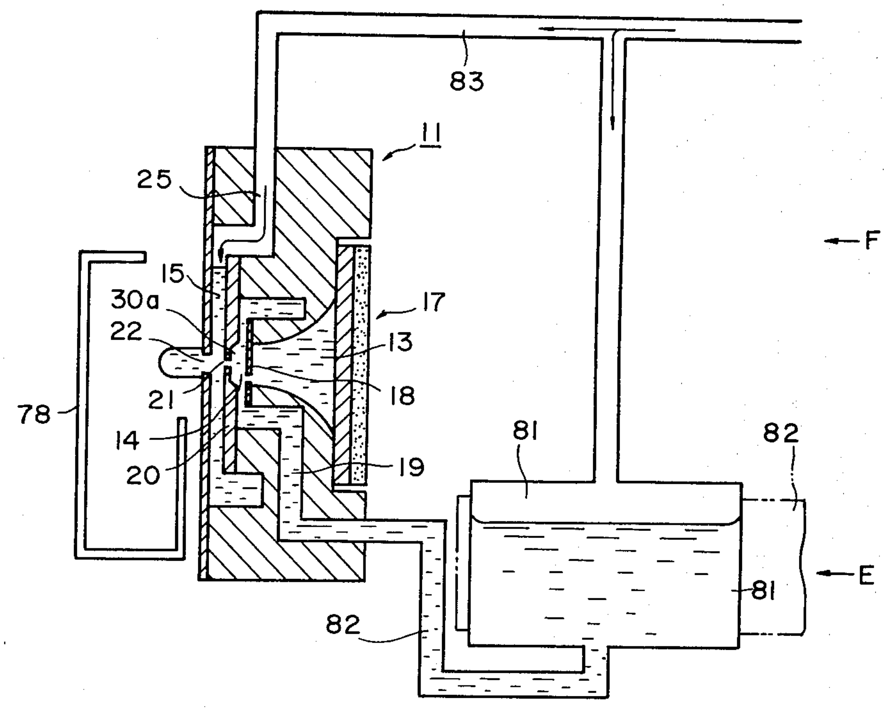
FIG. 15 is a vertical sectional view thereof in the stand-by position.

FIGS. 13 through 15 show the fifth embodiment, in which, in the same way as in the fourth one, ink to be projected from the ink cell 14 for printing is contained in the ink vessel 81 so as to be also used with that introduced into the air cell 15. The ink vessel 81 is made so as to move up and down with respect to the head 11 for introduction of ink from the ink cell 14 to the air cell 15 through the 1st orifice 21 in the same manner as in the third embodiment. The vessel 81 is embraced by the support frame 82 and capable of moving vertically. The ink feeding tubular part 19 in the head 11 communicating wih the ink cell 14 is connected to and communicated with the bottom part of said vessel 81 by means of a flexible tube 82. On the other hand, the air pump not shown is connected to the air feeding tubular part 25 communicating with the upper part of the air cell 15 through the flexible tube 83 which diverges on the way to the pump so as to communicate with the top of the ink vessel 81.

As shown in FIG. 13, the ink vessel 81 descends at the time of printing operation and lies in the ink recovery position lower than the air cell 15, pressurized air being fed into said air cell and the ink vessel 81 from the air pump. When the electric signal for printing is impressed to the piezo-electric element 17 under such conditions as above, ink 30*a* in the ink cell 14 is projected while turning into droplets through the orifice 21 and projected toward the recording paper 51 while being accelerated by air current blown through the orifice 22.

Ink 30*a* gradually reducing in quantity is replenished with ink fed from the ink vessel 81 pressurized by the air pump and flowing through the tube 82.

FIG. 14 shows the device lying in the home position A. The ink vessel 81 is in the ink introduction position F after raised and the orifice 22 is closed by the covering body 65 in the same way as in the previous embodiment. The air pump is at a stop. In such conditions as above, ink enters the air cell 15 or the air feeding tubular passage 25 to a level approximately equal to that of the ink vessel and covers the 1st orifice 21 to prevent clogging. It may be effective to drive the vibrator 18 and vibrate the piezo-electric element 17 for accelerating and inducing, respectively, ink flowing from the ink cell 14 to the air cell 15 through the orifice 21 during the abovesaid operation.

FIG. 15 shows the device lying in the stand-by position, in which a discharged-ink receptacle 78 is provided on the front side of the head 11. The ink vessel 81 is in the ink recovery position E and the air pump is in operation. Pressurized air, therefore, is fed into the air cell 15 and, when the head moves from the home position A to the printing-start position C, ink in the air cell 15 is spouted through the 2nd orifice 22 and recovered into the receptacle 78, thereby enabling subsequent smooth operation of printing. Contrary to the previous case, when the head moves from the printing-finish position, ink projection does not occur because of no presence of ink in the air cell 15. In either case, solidified ink sticking to the orifice 22 is blown off.

Summarizing the above description, in any embodiment, ink (or other liquids) is introduced into the air cell during non-printing operation for covering the orifice 21 in the ink cell 14 and preventing ink drying and solidification occurring around said orifice 21 as well as clogging is said orifice, and, further, suction of air resulting from ink volume reduction following evaporation of water content in ink 30*a* contained in the ink cell 14 and consequent decrease in ink spouting power imparted by vibration of the vibrator 18 are diminished. Since the head is in the home position and the air cell is filled with ink during non-printing operation, the air, which is sucked through the 2nd orifice 22 due to spatial volume increase in the head caused by accidental mechanical impact from outside, turns into bubbles to be mixed with ink in the air cell 15 and is afterward discharged, thereby no influence being imparted to ink in the ink cell 14 and stable ink projection characteristics being ensured even when receiving extraneous impact.

As this invention may be embodied in several forms without departing from the spirit of essential characteristics thereof, the present embodiments are therefor illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A method of preventing ink clogging in the ink droplet projecting device, in which an air cell is provided in front of the 1st orifice through which ink droplets are projected and the 2nd orifice facing said 1st orifice is provided in said air cell so that printing is performed by projection of ink droplets through said 2nd orifice, characterized in that liquid is introduced into said air cell for covering the 1st orifice during non-printing operation.

2. A method of preventing ink clogging as specified in claim 1 wherein said liquid is ink.

3. A method of preventing ink clogging as specified in claim 2 wherein said ink is of such kind as to be used for printing and introduced into the air cell through the 1st orifice for covering the 1st orifice during non-printing operation.

4. A method of preventing ink clogging as specified in claim 3 wherein ink is introduced into the air cell by changing relative positions of a vessel to contain ink and the air cell.

5. A method of preventing ink clogging as specified in claim 3 wherein ink is introduced into the air cell by raising air pressure in the part containing ink for printing higher than that in the air cell.

6. An ink droplet projecting device, in which an air cell is provided in front of the 1st orifice through which ink droplets are projected and the 2nd orifice facing said 1st orifice is provided in said air cell so that printing is performed by projection of ink droplets through said 2nd orifice, characterized in that a means is provided so that liquid is introduced into said air cell for covering the 1st orifice during non-printing operation and said liquid is discharged from the air cell for exposing the 1st orifice to the air during printing operation.

7. An ink droplet projecting device as specified in claim 6 wherein a vessel for containing said liquid to be introduced into the air cell is constructed in such manner as permitting alteration of relative vertical positions of said liquid vessel and the air cell according to operation as non-printing or printing.

8. An ink droplet projecting device as specified in claim 7 wherein said liquid vessel is capable of vertical movement independently of the air cell.

9. An ink droplet projecting device as specified in claim 7 wherein said liquid vessel is constructed so as to move in association with composing members of the cell for changing vertical relative positions of said vessel and the air cell.

10. An ink droplet projecting device as specified in claim 9 wherein said liquid vessel is provided integrally with the air cell.

11. An ink droplet projecting device as specified in claim 8, 9, or 10 wherein a covering body is provided for covering the 2nd orifice from the outside of the air cell.

12. An ink droplet projecting device as specified in claim 11 wherein a means is provided for projecting ink droplets through the 1st orifice and receiving them in the air cell, while said covering body covers the 2nd orifice.

13. An ink droplet projecting device as specified in claim 11 wherein a covering body for covering the 2nd orifice is made of porus material.

14. An ink droplet projecting device as specified in claim 13 wherein said covering body is provided with a recess at the part thereof facing the 2nd orifice and impregnated with liquid.

15. An ink droplet projecting device as specified in claim 12 wherein said liquid vessel is provided with a means of detecting liquid quantity contained therein and is in such structure as projecting ink droplets through the 1st orifice while letting the covering body cover the 2nd orifice when said liquid reduces in quantity.

16. An ink droplet projecting device as specified in claim 6 wherein a means is provided for feeding pressurized air to said air cell and is in such structure as projecting and discharging liquid in the air cell through the 2nd orifice by means of said pressurized air prior to printing operation.

17. An ink droplet projecting device as specified in claim 16 wherein a receptacle is provided for receiving liquid projected and discharged through the 2nd orifice.

18. An ink droplet projecting device as specified in claim 6, 7, 8, 9, 16, or 17 wherein a liquid to be introduced into the air cell during non-printing is ink.

19. An ink droplet projecting device as specified in claim 18 wherein an ink vessel for containing ink to be projected through the 1st orifice is also used as an ink vessel for receiving ink to be introduced into the air cell during non-printing operation.

20. An ink droplet projecting device as specified in claim 19 wherein a means of projecting ink droplets through the 1st orifice for printing is also driven at the time of said introduction of ink into the air cell.

21. An ink droplet projecting device as specified in claim 10, wherein a liquid to be introduced into the air cell during non-printing is ink.

22. An ink droplet projecting device as specified in claim 21 wherein a means of projecting ink droplets through the 1st orifice for printing is driven at the time of said introduction of ink into the air cell.

23. An ink droplet projecting device as specified in claim 6 wherein a covering body for covering the 2nd orifice during non-printing and a pressure control means for setting the pressure in the ink cell higher than that in the air cell when the 2nd orifice is covered up are provided so that ink is flowed from the ink cell to the air cell by actuating said pressure control means during non-printing operation.

24. An ink droplet projecting device as specified in claim 23 wherein a means of projecting ink droplets through the 1st orifice for printing is also driven at the time of said introduction of ink to the air cell.

25. An ink jet printer, in which an air cell is provided in front of the 1st orifice through which ink droplets are projected and the 2nd orifice facing said 1st orifice is provided in said air cell so that printing is performed by projection of ink droplets through said 2nd orifice, characterized in that an ink droplet projecting device having a means composed so that liquid is introduced into said cell for covering the 1st orifice during non-printing operation and said liquid is discharged from the air cell for exposing the 1st orifice to the air during printing operation.

26. An ink jet printer as specified in claim 25 wherein a means is provided for feeding pressurized air to said air cell.

27. An ink jet printer as specified in claim 25 wherein said liquid is ink.

28. An ink jet printer as specified in claim 26 or 27 wherein an ink vessel for containing ink to be projected through the 1st orifice is also used as an ink vessel for receiving ink to be introduced into the air cell during non-printing operation.

29. An ink jet printer as specified in claim 28 wherein a covering body for covering the 2nd orifice during non-printing operation and a pressurizing means for raising air pressure on the side of said ink vessel higher than that in the air cell when the 2nd orifice is covered up are provided so that ink is introduced into the air cell by actuating the pressure control means during non-printing operation.

* * * * *